Aug. 13, 1968          E. A. FINCH          3,396,875
CONTAINER WITH INTEGRAL MEASURING CHAMBER
Filed Nov. 25, 1966
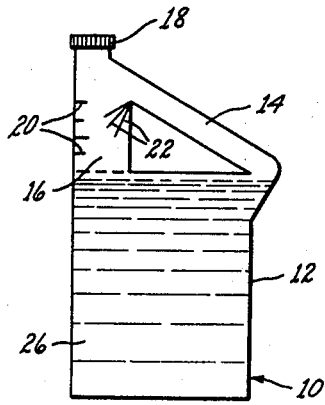
FIG.1
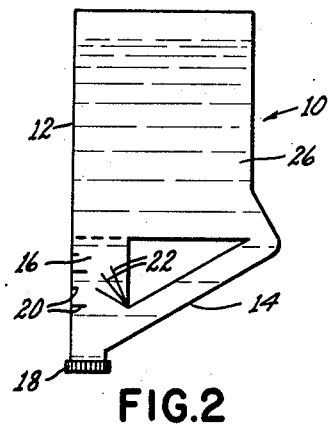
FIG.2
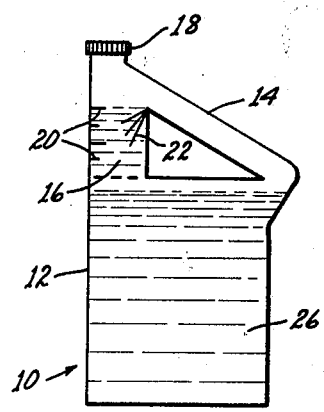
FIG.3
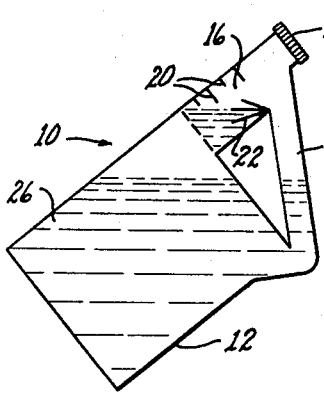
FIG.4
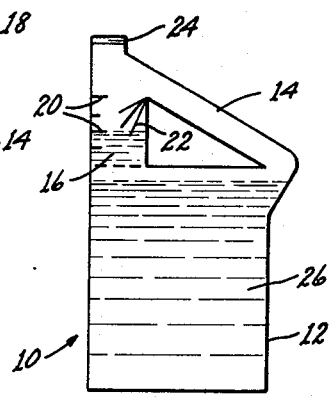
FIG.5
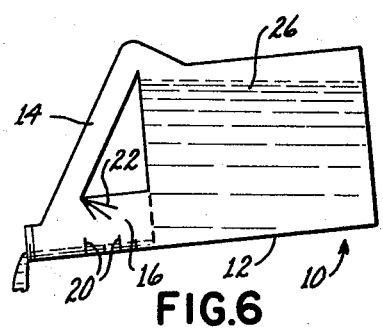
FIG.6
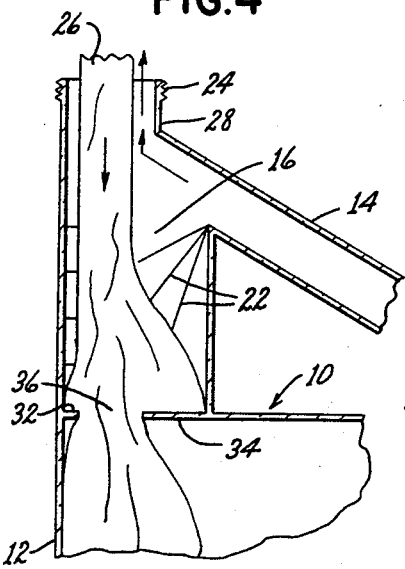
FIG.7
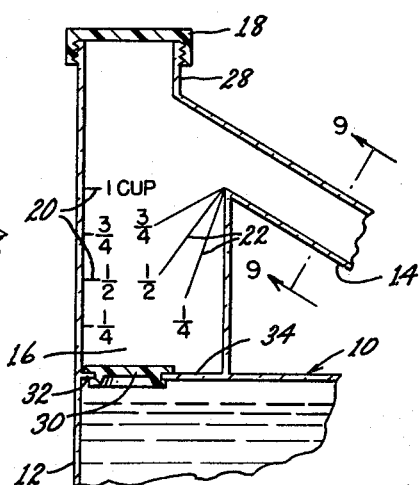
FIG.8
FIG.9
INVENTOR.
EARL A. FINCH
BY Richard P. Matthews
HIS ATTORNEY

United States Patent Office 3,396,875
Patented Aug. 13, 1968

3,396,875
CONTAINER WITH INTEGRAL MEASURING CHAMBER
Earl A. Finch, Richmond, Va. (% Richard P. Matthews, 2316 S. Eads St., Arlington, Va. 22202)
Filed Nov. 25, 1966, Ser. No. 596,933
3 Claims. (Cl. 222—456)

ABSTRACT OF THE DISCLOSURE

This invention discloses a container having an integral measuring chamber suitable for dispensing individual measured units or doses. One feature of the invention is a hollow handle structure which permits filling of the container therethrough. Another feature of the invention, constituting a preferred form thereof, is the provision of an alternate filling path through a measuring chamber into the main chamber with means for closing this alternate path after the container has been filled.

---

This invention pertains to containers and more particularly to containers for dispensing a measured unit or dose of the contents thereof.

The invention is particularly adaptable to bottles used to contain many household liquids requiring measured amounts for proper and efficient use. A specific area of urgent need for this invention is that of liquids used for laundering, such as bleaches, softeners, water conditioners, and the like. It is also suitable for containers used for insecticides, pesticides and various other toxic or potentially harmful products used by the general public.

One important desideratum for bottles and like containers suitable for dispensing a measured amount or portion is that it must be capable of being filled rapidly on automatic or semi-automatic equipment. It is an important feature of the present invention that the bottle containing a measuring chamber can be filled by more than one route or path. One of these routes permits an extremely rapid filling of the container whereby it may be filled on high speed filling lines. The other route or path of filling requires more time for filling the container and is used only where the filling requirements are not so critical.

Specifically, when it is desired to fill the bottle very rapidly, an aperture in the base of the measuring chamber in substantial vertical alignment with the neck of the container affords rapid filling of the container directly through the neck with the product passing through the measuring chamber directly into the main body chamber of the container. After the container has been filled, the aperture in the measuring chamber is closed by any suitable means and with any suitable closure element. When the requirements are such that the container may be filled at a slower rate, it is possible to place the closure element over the aperture in the measuring chamber before the filling begins whereby the container may be filled in an alternate route through a hollow handle. There is, of course, more turbulence in filling the container in this manner, but where that is not a handicap, the container may be filled in this manner.

Accordingly, it is a primary object of the present invention to provide a container for dispensing a measured unit or dosage which has alternate paths for filling, one of which lends itself to a very rapid filling of the container.

It is another object of the present invention to provide a container dispensing device in which a measured portion may be dispensed without pouring the contents from the main chamber of the container.

These and other objects, uses, and advantages of the invention will become apparent from a reading of this description which proceeds with reference to the accompanying drawings forming a part thereof and wherein:

FIGURE 1 is a side elevation view illustrating a bottle made in accordance with the present invention.

FIGURE 2 is a side elevational view of the bottle of FIGURE 1 shown in an inverted position.

FIGURE 3 is a side elevation view of the bottle of FIGURE 2 after it has been returned to an upright position.

FIGURE 4 is a side elevation view of the bottle of FIGURE 3 illustrating the manner in which a dosage less than that which will fill the measuring chamber may be obtained.

FIGURE 5 is a side elevation view of the bottle of FIGURE 4 which has been returned to an upright position with the cap removed.

FIGURE 6 is an end elevation view of the bottle of FIGURE 5 illustrating contents being poured from the measuring chamber.

FIGURE 7 is a fragmentary cross sectional view illustrating the manner in which the container of the present invention may be filled.

FIGURE 8 is a fragmentary cross sectional view similar to that shown in FIGURE 7 with a closure plug and cap being in place after the container has been filled.

FIGURE 9 is a cross sectional view taken along lines 9—9 of FIGURE 8.

While the various features of this invention are hereinafter illustrated and described as being particularly adaptable for liquids contained in bottles, it is to be understood that the various features of this invention can be utilized in connection with containers other than bottles and with fluids other than liquids. In the latter regard, it is necessary only that the product be pourable.

In its preferred form, the container is made from a plastic material, such as polyethylene, polypropylene, or the like, but the container could conceivably be made of glass, metal or other substance. Again in the preferred form, the container material should be at least translucent, and not opaque, so that fractional portions may be dispensed from the measuring chamber. However, where it is not desired to dispense less than the full contents of the measuring chamber, an opaque material, such as aluminum, may be used.

Therefore, this invention is not to be limited only to the embodiments illustrated in the drawings because the drawings are merely utilized to illustrate one of a wide variety of uses of this invention.

Referring now to FIGURES 1-6 of the drawings, a bottle is indicated generally at 10. This bottle is illustrated to have a main chamber 12 and a hollow handle 14 which provides communication between the main chamber 12 and a measuring chamber 16. The bottle is illustrated to have a top 18 and horizontal measuring indicia 20 as well as angular measuring indicia 22. By inverting the bottle as illustrated in FIGURE 2 and thereafter returning it to the upright position illustrated in FIGURE 3, it is possible to obtain a full measuring unit or dosage within measuring chamber 16.

By tilting the bottle rearwardly as illustrated in FIGURE 4 so that the liquid in the measuring chamber 16 aligns itself with one of the three angular measuring indicia 22 so as to provide a desired fraction of the entire dosage contained in measuring chamber 16. For example, there is illustrated to be three angular measuring indicia 22 so that one-fourth, one-half or three-quarters of the volumetric capacity of measuring chamber 16 may be measured and dispensed.

The hollow handle 14 is so constructed and arranged that after the desired quantity of product has been entrapped within measuring chamber 16, the bottle may be inverted so as to pour the contents of the bottle from the unit measuring chamber 16 without pouring any of the contents 26 from the main body chamber 12. The top 18 is suitably threaded, as at 24, to the upper portion of neck 28 of bottle 10.

Referring now to FIGURES 7-9, there is illustrated a preferred method of filling the bottle, especially suitable for use on high speed filling lines. Specifically, at the base of measuring chamber 16 there is illustrated ledges 32 and 34 which are on either side of an aperture 36 which is in substantial vertical alignment with the neck 28 so that the bottle 10 may be filled very rapidly directly through the neck 28 measuring chamber 16 and aperture 36 leading directly into the main body chamber 12. A suitable closure member 30 is used to close aperture 36 after the bottle has been filled. This closure member may take the form of a snap-in plug 30 as illustrated or could take any other suitable form such as a bayonet lock or a pressure sensitive tape sealed across aperture 36.

Where the filling requirements are not so severe and where considerably more turbulence in filling may be tolerated, it is possible to close aperture 36 by snap-in plug 30 or other suitable closure member before the filling begins so that the main body chamber 12 may be filled through the hollow handle 14.

From the foregoing it will be apparent that the hollow handle structure provides fluid communication between the main body chamber 12 and each of the neck 28 and measuring chamber 16 so that upon inversion of the bottle a measured amount of the contents may be poured from the measuring chamber without pouring the contents from the main body chamber. While FIGURE 9 shows the handle 14 to be rectangular in cross section, other optional shapes may be utilized.

It is also apparent that with the provision of an aperture 36 in the measuring chamber 16 that the bottle may be filled very rapidly directly through the measuring chamber 16 into the main body chamber 12 or the bottle may be filled by an alternate route by first closing the aperture 36 and filling through the hollow handle 14 into the main body chamber 12.

While the form of the invention now preferred has been disclosed as required by statute, other forms may be used, all coming within the scope of the claimed subject matter which follows.

What is claimed is:

1. A bottle for dispensing a measured unit or portion thereof consisting of a main body chamber, a neck, a unit measuring chamber in fluid communication with said neck, said unit measuring chamber being provided with aperture means to provide fluid communication with said main body chamber other than through said hollow handle whereby said main body chamber may be filled through the aperture in said unit measuring chamber, said unit measuring chamber further being provided with means for sealing the aperture therein after said main body chamber has been filled, whereby upon inversion of said bottle a measured amount of the contents of the bottle may be poured from said unit measuring chamber without pouring the contents from said main body chamber.

2. A bottle for dispensing a measured unit or portion thereof as claimed in claim 1, wherein said means for sealing the aperture in said unit measuring chamber consists of a snap-in plug.

3. A bottle for dispensing a measured unit or portion thereof as claimed in claim 1 wherein said aperture means in said unit measuring chamber is substantially in vertical alignment with said neck.

References Cited
UNITED STATES PATENTS

| | | | |
|---|---|---|---|
| 203,868 | 5/1878 | Adams | 222—481 |
| 570,759 | 11/1896 | Law | 222—456 |
| 547,862 | 10/1895 | Platt | 222—456 |
| 236,997 | 1/1881 | Dodge | 222—456 |
| 1,211,960 | 1/1917 | Potter | 222—481 X |
| 2,204,104 | 6/1940 | Masters | 222—424.5 X |
| 2,370,820 | 3/1945 | Stott | 222—456 |
| 2,687,628 | 8/1954 | Cunningham | 222—475 X |
| 2,816,695 | 12/1957 | Dagenais | 222—481 |
| 3,251,514 | 5/1966 | Speicher | 222—468 |

ROBERT B. REEVES, *Primary Examiner.*

N. L. STACK, JR., *Assistant Examiner.*